(12) United States Patent
Arvie, Jr.

(10) Patent No.: US 8,070,962 B2
(45) Date of Patent: Dec. 6, 2011

(54) USING OXIDIZING AGENTS TO REMOVE THIOCYANATES FROM BRINES

(75) Inventor: Morris Arvie, Jr., Houston, TX (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 12/027,737

(22) Filed: Feb. 7, 2008

(65) Prior Publication Data

US 2008/0207471 A1 Aug. 28, 2008

Related U.S. Application Data

(60) Provisional application No. 60/891,506, filed on Feb. 24, 2007, provisional application No. 60/951,375, filed on Jul. 23, 2007, provisional application No. 60/968,171, filed on Aug. 27, 2007.

(51) Int. Cl.
*C02F 1/72* (2006.01)
*C02F 1/76* (2006.01)
*C02F 1/52* (2006.01)

(52) U.S. Cl. ........ 210/719; 210/702; 210/721; 210/753; 210/754; 210/756; 210/759

(58) Field of Classification Search ............... 166/75.12; 175/206, 207, 66; 210/663, 683, 694, 702, 210/721, 747, 749, 753, 754, 756, 758, 759, 210/760, 904, 719, 903, 908; 423/366; 507/247
See application file for complete search history.

(56) References Cited

U.S. PATENT DOCUMENTS

| | | | | |
|---|---|---|---|---|
| 2,639,267 | A | * 5/1953 | Pfann | 423/366 |
| 4,059,513 | A | * 11/1977 | Zadera | 210/726 |
| 4,640,786 | A | 2/1987 | Soderquist et al. | |
| 4,645,608 | A | 2/1987 | Rayborn | |
| 4,941,982 | A | 7/1990 | Dadgar et al. | |
| 5,195,847 | A | 3/1993 | Guymon | |
| 5,944,195 | A | 8/1999 | Huang et al. | |
| 2005/0014654 | A1 | * 1/2005 | Qu et al. | 507/200 |

OTHER PUBLICATIONS

Wilson et al., "The oxidation of Thiocyanate ion by Hydrogen Peroxide. I. The pH-Independent Reaction," J. Am. Chem. Soc., 1960, 82 (17), 4515-4517.*

Kenova et al., "Thiocyanate Oxidation by Hydrogen Peroxide Gerenated in Gas Diffusion Electrode in Alkaline Medium," Chemistry for Sustainable Development, 10 (2002), 291-295.*

Mack et al. "Stress corrosion cracking of a cold worked 22Cr duplex stainless steel prodution tubing in a high density clear brine CaCl2 packer fluid—Results of the failure analysis at Deep Alex and associated laboratory experiments:," Corrosion, 2002, Paper No. 02067, Nace International. pp. 1-15.*

International Search Report issued in PCT Application No. PCT/US2008/054140 dated Jun. 24, 2008 (3 pages).

Written Opinion issued in PCT Application No. PCT/US2008/054140 dated Jun. 24, 2008 (4 pages).

Office Action issued in corresponding Canadian Application No. 2,679,204 dated Apr. 29, 2011 (2 pages).

* cited by examiner

*Primary Examiner* — Nam Nguyen
*Assistant Examiner* — Lucas Stelling
(74) *Attorney, Agent, or Firm* — Osha • Liang LLP

(57) ABSTRACT

A method for reclamation of a brine that includes mixing a brine containing thiocyanates with an oxidizing agent; and allowing for a time sufficient for the oxidizing agent to oxidize at least a portion of the thiocyanates is disclosed. Other methods may also include determining the quantity of unoxidized thiocyanates after the oxidizing treatment.

22 Claims, No Drawings

USING OXIDIZING AGENTS TO REMOVE THIOCYANATES FROM BRINES

CROSS-REFERENCE TO RELATED APPLICATIONS

This application, pursuant to 35 U.S.C. §119(e), claims priority to U.S. Patent Application Ser. Nos. 60/891,506, filed on Feb. 24, 2007, 60/951,375, filed on Jul. 23, 2007, and 60/968,171, filed on Aug. 27, 2007, all of which are herein incorporated by reference in their entirety.

BACKGROUND OF INVENTION

1. Field of the Invention

Embodiments disclosed herein relate generally to wellbore fluids. In particular embodiments disclosed herein relate to reclamation of brines in wellbore fluids.

2. Background Art

In the oil recovery industry and in hydrocarbon recovery, drilling fluids and well servicing fluids are used on a regular basis. When drilling or completing wells in earth formations, various fluids typically are used in the well for a variety of reasons. Common uses for well fluids include: lubrication and cooling of drill bit cutting surfaces while drilling generally or drilling-in (i.e., drilling in a targeted petroliferous formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, transmitting hydraulic horsepower to the drill bit, emplacing a packer, abandoning the well or preparing the well for abandonment, and otherwise treating the well or the formation.

The drilling fluids and other well servicing fluids that are used are either lost during the completion or drilling operation or recovery operation or, if recovered, are typically discarded. However, with increasing technology, the completion or drilling fluids either for an environmental reason and/or expense reasons are being recovered for reuse. This is especially true with high tech well servicing and drilling fluids that are quite expensive, and thus their recovery is relatively important since being able to use the well servicing fluids, and in particular the brine in the well servicing fluids, will greatly reduce the cost of future completion or drilling operations.

Brines (such as, for example, aqueous $CaBr_2$) commonly are used as well fluids because of their wide density range and the fact that brines are typically substantially free of suspended solids. In addition, brines are often used in order to achieve a suitable density for use in well completion or drilling operations. Typically, brines comprise halide salts of mono- or divalent cations, such as sodium, potassium, calcium, and zinc. Chloride-based brines of this type have been used in the petroleum industry for over 50 years; bromide-based brines, for at least 25 years; and formate-based brines, for roughly the past ten years. One additional advantage of using brines is that brines typically do not damage certain types of downhole formations; and for formations that are found to interact adversely with one type of brine, often there is another type of brine available with which those formations will not interact adversely.

A variety of compounds are typically added to brine-based well fluids. For example, a brine-based well fluid may also include viscosifiers, corrosion inhibitors, lubricants, pH control additives, surfactants, solvents, and/or weighting agents, among other additives. Some typical corrosion inhibitors include amine-based or inorganic thiocyanate-based compounds, which are designed to help prevent general corrosion attack on casing, tubing and downhole tools in contact with the completion or drilling fluid.

While thiocyanates are useful inhibitors at some low to medium temperature ranges, at temperatures of 350° F. (177° C.) and upwards, thiocyanates and other sulfur-containing additives are believed to be prone to thermal decomposition and subsequent environmentally induced corrosion cracking of tubular goods, especially those of high strength corrosion resistant alloys. However, sulfates are not believed to be among this group of sulfur containing additives believed to be prone to thermal decomposition and subsequent environmentally induced corrosion cracking of tubular goods. Stress corrosion cracking has also been postulated to be a risk as a result of hydrogen sulfide production from the decomposition of thiocyanates.

In the life cycle of completion brine, initially formulated stock brines are custom-blended with a variety of additives depending on the particular application. If the list of additives includes corrosion inhibitors, then the brine may have come to contain thiocyanates by deliberate addition; however, cross-contamination may also be a reason for a used completion brine to contain thiocyanates. Once used, a completion fluid that is returned to the surface may optionally be subjected to reclamation processes for reuse in a subsequent application. Such fluids may be contaminated with any or all of the following: water, drilling mud, formation materials, rust, scale, pipe dope, and viscosifiers and bridging agents used for fluid-loss-control pills. Depending on their composition and level of contamination, these fluids may or may not have further practical or economic value. If it is deemed that the fluids have future use potential, they may be reclaimed. Conversely, if they are determined to have no further use, they must be disposed of in an environmentally responsible way.

Conversely, if it is deemed that the fluids have future use potential, they may be reclaimed. There are many known methods for removing contaminates from a brine solution. Among the various approaches removal of suspended solids by filtration, pH adjustments, chemical treatment, carbon treatment, etc. Current API recommended practices specify the testing for such components such as solids, pH, and iron; however, it is likely that in the future the recommended practices will also include a specification on the maximum allowable thiocyanate content. Furthermore, while a thiocyanate-based additive may be innocuous in a first, medium temperature drilling operation, a subsequent drilling operation may be at higher temperatures, presenting a risk of thiocyanate degradation and hydrogen sulfide production. Reclamation processes to date have not focused on the removal of thiocyanates from brines.

Accordingly, there exists a need for reclamation processes for brines in which thiocyanates may be effectively removed therefrom for reuse in subsequent operations.

SUMMARY OF INVENTION

In one aspect, embodiments disclosed herein relate to a method for reclamation of a brine that includes mixing a brine containing thiocyanates with an oxidizing agent; and allowing for a time sufficient for the oxidizing agent to oxidize at least a portion of the thiocyanates.

In another aspect, embodiments disclosed herein relate to a method for reclamation of a brine that includes mixing a brine containing thiocyanates with an oxidizing agent selected from at least one of a peroxide, triiodide ion, and an oxyanion of chlorine, bromine, and iodine; allowing for a time sufficient for the oxidizing agent to oxidize at least a portion of the thiocyanates; and determining the quantity of unoxidized thiocyanates after the oxidizing.

Other aspects and advantages of the invention will be apparent from the following description and the appended claims.

DETAILED DESCRIPTION

In one aspect, embodiments disclosed herein relate to reclamation of brines. In another aspect, embodiments disclosed herein relate to reclamation of brines containing thiocyanates.

In particular, embodiments of the present disclosure relate to treatment process of brines for the removal of thiocyanates to environmentally acceptable levels prior to reuse of brines in subsequent completion or drilling or other operations. According to embodiments of the present disclosure, thiocyanates may be converted into a non- or less-toxic form via an oxidation reaction as shown in the simplified form below:

$$N{\equiv}C{-}S^- + \text{Oxidizing Agent} \rightarrow SO_4^{-2} + CO_2 + N_2$$

Following the oxidation reaction, the oxidation products (i.e., sulfate ions, carbon dioxide, nitrogen) may be removed from the brine if desired.

Brines which may be subjected to the reclamation processes disclosed herein may include any solution that is used in oil and gas well completion or drilling systems and in similar applications, such as solutions used in completion or drilling, producing and storing oil and gas from subterranean earth formations. In particular, brines which may be subjected to the reclamation processes disclosed herein may include seawater, aqueous solutions wherein the salt concentration is less than that of sea water, or aqueous solutions wherein the salt concentration is greater than that of sea water. The salinity of seawater may range from about 1 percent to about 4.2 percent salt by weight based on total volume of seawater. The solutions typically contain metal salts, such as but not limited to, transition metal salts, alkali metal salts, alkaline earth metal salts, and mixtures thereof. Exemplary salts include halides of zinc, calcium, and mixtures thereof. For example, the solution can include zinc halide, such as zinc bromide or zinc chloride or both, optionally in combination with calcium bromide or calcium chloride or both. Salts that may be found in seawater include, but are not limited to, sodium, calcium, aluminum, magnesium, potassium, strontium, silicon, and lithium salts of chlorides, bromides, carbonates, iodides, chlorates, bromates, formates, nitrates, oxides, sulfates, phosphates, and fluorides. Salts that may be incorporated in a given brine include any one or more of those present in natural seawater or any other organic or inorganic dissolved salts. Additionally, brines that may be used in the completion or drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium. The brine solution can include the salts in conventional amounts, generally ranging from about 1% to about 80%, and preferably from about 20% to about 60%, based on the total weight of the solution, although as the skilled artisan will appreciate, amounts outside of this range can be used as well.

Further, embodiments of the present disclosure may include the reclamation of "specialty" brines that include at least one alkali metal salt of a transition metal oxy-anion or polyoxy-anion, such as, for example, an alkali metal polytungstate, an alkali metal heteropolytungstate, an alkali metal polymolybdate or an alkali metal heteropolymolybdate.

The treatment process of the present disclosure may be used to oxidize and/or remove at least a portion of the thiocyanates present in brines recovered from a completion or drilling operation. Typical inorganic thiocyanates that are used in aqueous oilfield brine solutions and that may be oxidized and/or removed therefrom include a variety of inorganic thiocyanates such as, for example, sodium thiocyanate, potassium thiocyanate, ammonium thiocyanate, or combinations thereof. Typically, thiocyanates are added to a wellbore fluid in amounts in the range of about 0.05 to about 1 wt % based on the total weight of the solution including additives. Further, while reference has been made to certain types of thiocyanates, no limitation is intended on the scope of the present disclosure. Rather, one of ordinary skill in the art would recognize that the reclamation processes disclosed herein may be used on other thiocyanates as well.

The oxidizing agents that may be used in the reclamation processes of the present disclosure may include peroxides such as, for example, hydrogen peroxide and calcium peroxide, oxyanions of chlorine, bromine, and iodine such as, for example, hypochlorites, chlorates, perchlorates, bromates, iodates, and triiodide ions. In particular embodiment, hydrogen peroxide is used as the oxidizing agent. However, one of ordinary skill in the art would appreciate that other types of oxidizing agents may be used to oxidize the thiocyanates of the present disclosure. One of ordinary skill in the art would appreciate that depending on the type of oxidizing agent, the time required to allow for sufficient oxidation of the thiocyanates may vary. In a particular embodiment, allowing at least 10 to 12 hours of stirring for a small volume and at least 16-24 hours for a larger volume will be sufficient to remove the thiocyanate present in the fluid. Further one of ordinary skill in the art that depending on the particular type of oxidizing agent and the corresponding stoichiometry, the amount of the oxidizing agent may also vary. In various embodiments, the ratio of oxidizing agent to thiocyanate may range from 1 mg/L:3 mg/L to 1 mg/L:10 mg/L and from 1 mg/L:3 mg/L to 1 mg/L:7 mg/L in another embodiment. In other various embodiments, the amount of oxidizing agent used may range from 1 to 4 equivalent pounds per barrel for each barrel of fluid treated.

Further, depending on the type of brine that may be treated by the reclamation process of the present disclosure, the sulfates that may be produced by the oxidation of the thiocyanates may be either soluble or insoluble. For example, if the brine contains sufficient calcium ions, sulfate ions may precipitate out as a calcium sulfate salt. If soluble sulfate ions remain in the treated brine following reclamation, the soluble sulfates may be converted to an insoluble form via addition of sulfate-precipitating cations. The insoluble sulfate salts may then be optionally removed from the brine via conventional separation techniques known in the art.

After exposing the contaminated brine to the oxidizing agent and allowing the oxidizing agent to oxidize at least a portion of the thiocyanates present in the brine, quantification of the remaining unoxidized thiocyanates remaining in the brine may be performed or determined. In one embodiment, after oxidation, the amount of unoxidized thiocyanates may be less than 20 mg/L, less than 10 mg/L in another embodiment, and less than 5 mg/L in yet another embodiment. If the level of unoxidized thiocyanates is greater than desired, one of ordinary skill in the art would appreciate that a second treatment cycle of oxidation may be optionally performed. One of ordinary skill in the art would appreciate that the thiocyanate quantification may be manual or automated, and may be tested before and/or after oxidation.

In addition to the oxidizing process of the present reclamation process, additional reclamation steps may be performed on the brines of the present disclosure for further treatment. For example, in various embodiments, reclamation processes such as, for example, filtration, carbon treatment, acidic/caustics, reducing agent and/or flocculants may be used to perform addition treatments for, for example, the removal of solids, iron, and/or residual contaminants and adjustment of pH. In some embodiments, the oxidizing treatments of the present disclosure may aid in iron removal, while in other embodiments, the treatments do not, and a separate treatment for iron removal may be necessary if iron removal is desired.

Additionally, in another embodiment, the oxidizing agent may, in addition to oxidizing the unwanted thiocyanates, also oxidize other ions or chemicals present in the fluid, or itself to form residual contaminants that may be desirably removed. For example, one skilled in the art would appreciate that treatment of a brine fluid with an oxidizing agent may, in addition to oxidizing the thiocyanates, oxidize bromide or chloride ions, etc., naturally present in the brine to bromate and chlorate ions. Thus, as it may be desirable to remove such ions from the fluid prior to reuse, in such an embodiment, secondary reclamation treatments, such as treatment with a reducing agent and/or carbon treatment, may be used subsequent to the oxidation treatment. In a particular embodiment a mild reducing agent (or oxidant scavenger) may be used alone or in combination with carbon treatment to reduce the level of contamination. Exemplary reducing agents may include addition of iodide (such as potassium iodide), sulfite (such as sodium sulfite), organic acids with reducing capabilities (oxalic, citric, formic, etc), among others. One skilled in the art would appreciate that this list is not exhaustive, and that any reducing agent may be used, preferably one whereby the byproduct would cause minimal interference (such as corrosion) or be readily reacted with reducing agents present in a fluid, e.g., starch to render it innocuous.

In yet another embodiment, removal of organic contaminants present in a brine may be necessary prior to removal of thiocyanates by the oxidizing agents of the present disclosure so as to reduce interactions between such organic contaminants and thiocyanates. Alternatively, if such interaction occurs between organic contaminants and thiocyanate scavengers, instead of first removing organic contaminants, it may be desirable to simply increase the amount of oxidizing agent added to the contaminated fluid to obtain reduction in thiocyanates.

EXAMPLES

The following examples show various embodiments (and comparative data) of reclamation processes according to the present disclosure.

Example 1

A 16.1 lb/gal $ZnBr_2$ brine is subjected to a reclamation process. To the brine, a solution of 0.12 GPB of 50% $H_2O_2$ is added and the brine stirred for two hours. A volume of 1% (v/v) of SAFE FLOC™ I, a flocculent available from M-I LLC (Houston, Tex.) is added to the brine, and the brine stirred for another two hours. After allowing the brine to stand static for a period of 24 hours, the brine is filtered through Diatomaceous Earth (Medium) Filtration filter press or through Filter Simulation using a glass fiber filter, vacuum flask, and filter funnel are used to simulate the filtration procedure in the lab. The fluid properties of the initial brine and the brine following the reclamation process are shown below in Table 1. The Iron Chemets Kit K-6002, available from CHEMetrics, Inc. (Calverton, Va.) and described in SPE 86551, is a field method for determining the levels of iron contamination in all oilfield completion brine and is used in the lab for comparisons to analytical laboratory results.

TABLE 1

| Property | Initial Fluid Properties | Fluid Properties After Reclamation |
|---|---|---|
| Density @ 70° F. (lb/gal) | 16.1 | 16.0 |
| True Crystallization Temp (° F.) | — | <9° |
| Clarity (ntu) | (too high to measure) | 2 |
| pH (direct) | 4.1 | 4.0 |
| Color (visual) | Dark Green | Light Amber |
| Odor | None | None |
| Compatibility with Stock Fluid | | |
| 11.6 $CaCl_2$ (1:1) | — | OK |
| 15.1 $CaBr_2/CalCl_2$ (1:1) | — | OK |
| 19.2 $ZnBr_2$ (1:1) | — | OK |
| Primary Iron determination (wppm) | 145 | 19 |
| Iron Chemets K-6002 Kit (wppm) | 181 | 21 |
| Thiocyanate ions (mg/L) | 221 | 9 |

Example 2

A 14.9 lb/gal $ZnBr_2$ brine is subjected to a reclamation process. To the brine, a solution of 0.12 gpb of 50% $H_2O_2$ is added and the brine stirred for two hours. A volume of 1% (v/v) of SAFE FLOC™ I, a flocculent available from M-I LLC (Houston, Tex.) is added to the brine, and the brine stirred for another two hours. After allowing the brine to stand static for a period of 24 hours, the brine is filtered through a DE (Medium) filter. The fluid properties of the initial brine and the brine following the reclamation process are shown below in Table 2.

TABLE 2

| Property | Initial Fluid Properties | Fluid Properties After Reclamation |
|---|---|---|
| Density @ 70° F. (lb/gal) | 14.9 | 14.8 |
| True Crystallization Temp (° F.) | — | <9° |
| Clarity (ntu) | 148 | 1 |
| pH (direct) | 4.6 | 4.3 |
| Color (visual) | Dark Amber w/ Green Iron | Light Amber |
| Odor | None | None |
| Compatibility with Stock Fluid | | |
| 11.6 $CaCl_2$ (1:1) | — | OK |
| 15.1 $CaBr_2/CalCl_2$ (1:1) | — | OK |
| 19.2 $ZnBr_2$ (1:1) | — | OK |
| Iron (wppm) | 120 | 8 |
| Iron Chemets K-6002 Kit (wppm) | 252 | 6 |
| Thiocyanate ions (mg/L) | 105 | 12 |

Example 3

A 17.1 lb/gal $ZnBr_2$ brine is subjected to a reclamation process. To the brine, a solution of 0.12 gpb of 50% $H_2O_2$ is added and the brine stirred for two hours. A volume of 3%

(v/v) of SAFE FLOC™ I, a flocculent available from M-I LLC (Houston, Tex.) is added to the brine, and the brine stirred for another two hours. After allowing the brine to stand static for a period of 24 hours, the brine is filtered through DE (Medium) filtration or filter simulation. The fluid properties of the initial brine and the brine following the reclamation process are shown below in Table 3.

TABLE 3

| Property | Initial Fluid Properties | Fluid Properties After Reclamation |
|---|---|---|
| Density @ 70° F. (lb/gal) | 17.12 | 16.95 |
| True Crystallization Temp (° F.) | — | 7 |
| Clarity (ntu) | THTM | 2 |
| pH (direct) | 2.9 | 3.4 |
| Color (visual) | Rusty Brown | Light Amber |
| Odor | None | None |
| Compatibility with Stock Fluid | | |
| 11.6 CaCl$_2$ (1:1) | — | OK |
| 15.1 CaBr$_2$/CalCl$_2$ (1:1) | — | OK |
| 19.2 ZnBr$_2$ (1:1) | — | OK |
| Iron (wppm) | 838 | 17 |
| Iron Chemets K-6002 Kit (wppm) | >500 | 7 |
| Thiocyanate ions (mg/L) | Too Dirty to Test | <3 |

Example 4

A 17.77 lb/gal ZnBr$_2$ brine is subjected to a reclamation process. One lab barrel was of brine was acidified with 24.8 g HCl to a pH of 0, and stirred for 4 hours. To 0.1 bbl of brine, 0.2 lbs of calcium hypochlorite was added and stirred for 16 hours. The brine is then syringe filtered. The thiocyanate levels of the initial brine and the brine following the reclamation process are shown below in Table 4.

TABLE 4

| Property | Initial Fluid Properties | Fluid Properties After Reclamation |
|---|---|---|
| Density @ 70° F. (lb/gal) | — | — |
| True Crystallization Temp (° F.) | — | — |
| Clarity (ntu) | — | — |
| pH (direct) | — | — |
| Color (visual) | — | — |
| Odor | — | — |
| Compatibility with Stock Fluid | — | — |
| 11.6 CaCl$_2$ (1:1) | — | — |
| 15.1 CaBr$_2$/CalCl$_2$ (1:1) | — | — |
| 19.2 ZnBr$_2$ (1:1) | — | — |
| Iron (wppm) | — | — |
| Iron Chemets K-6002 Kit (wppm) | — | — |
| Thiocyanate ions (mg/L) | 40 | 5.8 |

Example 5

A 16.32 lb/gal ZnBr$_2$ brine is subjected to a reclamation process. To the brine, 0.2% (v/v) of SAFE FLOC™ I, a flocculent available from M-I LLC (Houston, Tex.) is added to 0.5 bbl brine, and the brine stirred for three hours. The brine is then filtered through DE (Medium) filtration or filter simulation. The fluid properties of the initial brine and the brine following the reclamation process are shown below in Table 5A.

TABLE 5A

| Property | Initial Fluid Properties | Fluid Properties After Reclamation |
|---|---|---|
| Density @ 70° F. (lb/gal) | 16.32 | 16.23 |
| True Crystallization Temp (° F.) | — | <10 |
| Clarity (ntu) | 46 | 1 |
| pH (direct) | 4.4 | 4.4 |
| Color (visual) | Amber | Light Amber |
| Odor | None | None |
| Compatibility with Stock Fluid | | |
| 11.6 CaCl$_2$ (1:1) | — | OK |
| 15.1 CaBr$_2$/CalCl$_2$ (1:1) | — | OK |
| 19.2 ZnBr$_2$ (1:1) | — | OK |
| Iron (wppm) | 70 | 9 |
| Iron Chemets K-6002 Kit (wppm) | ~77 | 5 |
| Thiocyanate ions (mg/L) | 70 | 65 |

Following the treatment for iron removal, 0.25 mL of 50% hydrogen peroxide was added to 0.25 bbl of the reclaimed fluid. The thiocyanate levels are shown below in Table 5B.

TABLE 5B

| Property | Initial Fluid Properties | Fluid Properties After Reclamation |
|---|---|---|
| Density @ 70° F. (lb/gal) | — | — |
| True Crystallization Temp (° F.) | — | — |
| Clarity (ntu) | — | — |
| pH (direct) | — | — |
| Color (visual) | — | — |
| Odor | — | — |
| Compatibility with Stock Fluid | — | — |
| 11.6 CaCl$_2$ (1:1) | — | — |
| 15.1 CaBr$_2$/CalCl$_2$ (1:1) | — | — |
| 19.2 ZnBr$_2$ (1:1) | — | — |
| Iron (wppm) | — | — |
| Iron Chemets K-6002 Kit (wppm) | — | — |
| Thiocyanate ions (mg/L) | 65 | Not detected <3 |

Example 6

An 18.0 lb/gal ZnBr$_2$ brine is subjected to a reclamation process. To four samples of 0.1 bbl of the brine, various oxidizers were added. The oxidizers and thiocyanate levels are shown below in Table 6. SAFE-BREAK™ L is an oxidizing agent available from M-I LLC (Houston, Tex.).

TABLE 6

| Treatment | Initial Thiocyanate (mg/L) | Thiocyanate After Reclamation (mg/L) |
|---|---|---|
| 0.3 lbs SAFE-BREAK ™ L | 208 | 10 |
| 0.2 lbs CaO$_2$ | 208 | 10 |
| 0.3 lbs Ca(ClO$_2$)$_2$ | 208 | 6 |
| 0.1 mL 50% H$_2$O$_2$ | 208 | 10 |

Comparative Example 1

A 15.5 lb/gal ZnBr$_2$ brine is subjected to a reclamation process. The brine is filtered through DE (Medium) filtration or filter simulation. The fluid properties of the initial brine and the brine following the reclamation process are shown below in Table 7.

TABLE 7

| Property | Initial Fluid Properties | Fluid Properties After Reclamation |
|---|---|---|
| Density @ 70° F. (lb/gal) | 15.5 | 15.5 |
| True Crystallization Temp (° F.) | — | <8 |
| Clarity (ntu) | 40 | 1 |
| pH (direct) | 4.9 | 4.7 |
| Color (visual) | Amber | Amber |
| Odor | SAFE FLOC ™ I | None |
| Compatibility with Stock Fluid | | |
| 11.6 $CaCl_2$ (1:1) | — | OK |
| 15.1 $CaBr_2$/$CalCl_2$ (1:1) | — | OK |
| 19.2 $ZnBr_2$ (1:1) | — | OK |
| Iron (wppm) | 35 | 22 |
| Iron Chemets K-6002 Kit (wppm) | 38 | 27 |
| Thiocyanate ions (mg/L) | 349 | 337 |

Comparative Example 2

A 17.8 lb/gal $ZnBr_2$ brine is subjected to a reclamation process. To the brine, 0.5 lb/bbl of Field Grade Carbon is added to the brine, and the brine mixed at very high shear for 24 hours. The brine is then filtered through DE (Fine) filtration or filter simulation. The fluid properties of the initial brine and the brine following the reclamation process are shown below in Table 8.

TABLE 8

| Property | Initial Fluid Properties | Fluid Properties After Reclamation |
|---|---|---|
| Density @ 70° F. (lb/gal) | 17.83 | 17.77 |
| True Crystallization Temp (° F.) | Not Applied | 6 |
| Clarity (ntu) | 73 | 1 |
| pH (direct) | 2.9 | 2.7 |
| Color (visual) | Light Green | Light Amber |
| Odor | None | None |
| Compatibility with Stock Fluid | | |
| 11.6 $CaCl_2$ (1:1) | — | OK |
| 15.1 $CaBr_2$/$CalCl_2$ (1:1) | — | OK |
| 19.2 $ZnBr_2$ (1:1) | — | OK |
| Iron (wppm) | 403 | 9 |
| Iron Chemets K-6002 Kit (wppm) | ~350 | 9 |
| Thiocyanate ions (mg/L) | 35 | 32 |

Comparative Example 3

A 14.7 lb/gal $ZnBr_2$ brine is subjected to a reclamation process. To the brine, 6 ppb of hot lime (CaO) is added, and the brine stirred for twenty four hours. The brine is then filtered through DE (Medium) filtration or filter simulation. The fluid properties of the initial brine and the brine following the reclamation process are shown below in Table 9.

TABLE 9

| Property | Initial Fluid Properties | Fluid Properties After Reclamation |
|---|---|---|
| Density @ 70° F. (lb/gal) | 14.7 | 14.7 |
| True Crystallization Temp (° F.) | — | <6° |
| Clarity (ntu) | 3 | 1 |
| pH (direct) | 0.3 | 5.7 |
| Color (visual) | Light Amber | Light Amber |
| Odor | None | None |
| Compatibility with Stock Fluid | | |
| 11.6 $CaCl_2$ (1:1) | — | OK |
| 15.1 $CaBr_2$/$CalCl_2$ (1:1) | — | OK |
| 19.2 $ZnBr_2$ (1:1) | — | OK |
| Iron (wppm) | 77 | 13 |
| Iron Chemets K-6002 Kit (wppm) | 85 | 20 |
| Thiocyanate ions (mg/L) | 100 | 93 |

Comparative Example 4

An 17.9 lb/gal $ZnBr_2$ brine is subjected to a reclamation process. To the brine, 0.5 lb/bbl of Field Grade Carbon is added to the brine, and the brine mixed at very high shear for 24 hours. The brine is then filtered through DE (Fine) filtration or filter simulation. The fluid properties of the initial brine and the brine following the reclamation process are shown below in Table 10.

TABLE 10

| Property | Initial Fluid Properties | Fluid Properties After Reclamation |
|---|---|---|
| Density @ 70° F. (lb/gal) | 17.91 | 17.82 |
| True Crystallization Temp (° F.) | — | 14 |
| Clarity (ntu) | THTM | 1 |
| pH (direct) | 3.0 | 3.3 |
| Color (visual) | Green | Light Amber |
| Odor | None | None |
| Compatibility with Stock Fluid | | |
| 11.6 $CaCl_2$ (1:1) | — | OK |
| 15.1 $CaBr_2$/$CalCl_2$ (1:1) | — | OK |
| 19.2 $ZnBr_2$ (1:1) | — | OK |
| Iron (wppm) | 500 | 7 |
| Iron Chemets K-6002 Kit (wppm) | >465 | 2 |
| Thiocyanate ions (mg/L) | 60 | 55 |

Example 7

A 14.8 lb/gal $ZnBr_2$/$CaBr_2$ brine viscosified with 4 ppb FLO-VIS™ L and contaminated with 30 mg/l ferrous chloride and 200 mg/L potassium thiocyanate is subjected to a reclamation process. To the viscosified brine, various quantities of oxidizing agent are added to samples of the viscous brine, and the samples are mixed at moderate shear for 15 minutes and then hot rolled at 150° F. for 12 hours. The fluid properties of the treated brines are shown below in Table 11, and are compared to unviscosified, uncontaminated and contaminated brines showing removal of thiocyanates in viscosified brines. Visual observation of the samples revealed that only Sample 5 below resulted in breaking of the viscosifying polymer, whereas the oxidizing treatments applied to the other samples were sufficient to reduce or remove thiocyanates, without breaking the viscosifying polymer.

TABLE 11

| Sample No. | Fluid | mg/kg Iron | mg/L Thiocyanate |
|---|---|---|---|
| 1 | 14.8 lb/gal $ZnBr_2$/$CaBr_2$ brine | 7 | Not Detected (<3 mg/L) |

TABLE 11-continued

| Sample No. | Fluid | mg/kg Iron | mg/L Thiocyanate |
|---|---|---|---|
| 2 | Sample 1 + 30 mg/L FeCl$_2$ + 200 mg/L KSCN | 19 | 180 |
| 3 | Sample 2 + 2.5 lb/bbl FLO-VIS ™ L + 1 lb/bbl eq. Ca(ClO)$_2$ | 24 | 136 |
| 4 | Sample 2 + 2.5 lb/bbl FLO-VIS ™ L + 2.5 lb/bbl eq. Ca(ClO)$_2$ | 23 | Trace (<5 mg/L) |
| 5 | Sample 2 + 2.5 lb/bbl FLO-VIS ™ L + 4 lb/bbl eq. Ca(ClO)$_2$ | 22 | Not Detected (<3 mg/L) |
| 6 | Sample 2 + 2.5 lb/bbl FLO-VIS ™ L + 1 lb/bbl eq. LiClO | 22 | 119 |
| 7 | Sample 2 + 2.5 lb/bbl FLO-VIS ™ L + 2.5 lb/bbl eq. LiClO | 21 | 38 |
| 8 | Sample 2 + 2.5 lb/bbl FLO-VIS ™ L + 4 lb/bbl eq. LiClO | 21 | Trace (<5 mg/L) |
| 9 | Sample 2 + 2.5 lb/bbl FLO-VIS ™ L + 0.1 gal/bbl 50% H$_2$O$_2$ | 22 | Not Detected (<3 mg/L) |
| 10 | Sample 2 + 2.5 lb/bbl FLO-VIS ™ L + 0.25 gal/bbl 50% H$_2$O$_2$ | 21 | Not Detected (<3 mg/L) |
| 11 | Sample 2 + 2.5 lb/bbl FLO-VIS ™ L + 0.4 gal/bbl 50% H$_2$O$_2$ | 21 | Not Detected (<3 mg/L) |

Example 8

A scale-up test was performed on 470 barrels of a contaminated 14.2 lb/gal ZnBr$_2$ brine. To the brine, 3.25 lb/bbl of calcium hypochlorite is added, and the brine mixed at very high shear for 24 hours and then allowed to stand static for 24-48 hours. The brine is then pumped from the top of the tank without disturbing settled particulates and filtered through DE (Medium) filtration. The fluid properties of the initial brine and the brine following the reclamation process are shown below in Table 12.

TABLE 12

| Property | Initial Fluid Properties | Fluid Properties After Reclamation |
|---|---|---|
| Density @ 70° F. (lb/gal) | 14.2 | 14.2 |
| True Crystallization Temp (° F.) | — | 9 |
| Clarity (ntu) | 23 | 7.0 |
| pH (direct) | 5.4 | 5.5 |
| Color (visual) | Light Amber | Light Amber |
| Odor | None | None |
| Compatibility with Stock Fluid | | |
| 11.6 CaCl$_2$ (1:1) | — | OK |
| 15.1 CaBr$_2$/CalCl$_2$ (1:1) | — | OK |
| 19.2 ZnBr$_2$ (1:1) | — | OK |
| Iron (wppm) | 16 | 18 |
| Iron Chemets K-6002 Kit (wppm) | 12 | 9 |
| Thiocyanate ions (mg/L) | 545 | 8 |

Example 9

The contaminated and reclaimed brine of Example 8 were subjected to an analytical analysis to determine the presence (and amount) of residual contaminants, specifically salts of oxyacids that may have formed during the reclamation process, for subsequent treatment. The results of the ion chromatography analysis are shown below in Table 13.

TABLE 13

| Ion | Contaminated | Reclaimed |
|---|---|---|
| Bromate (BrO$_3^-$) | ND (<100 mg/L) | 300 mg/L |
| Chlorate (ClO$_3^-$) | ND (<100 mg/L) | 320 mg/L |
| Chlorite (ClO$_2^-$) | ND (<100 mg/L) | ND (<100 mg/L) |
| Hypobromite (BrO$^-$) | ND | ND |
| Hypochlorite (ClO$^-$) | ND | ND |

Example 10

Samples (0.142 bbl) of reclaimed brine of Example 8 were subjected to treatment with various amounts of SAFE-SCAV™ CA, an oxidant scavenger commercially available from M-I LLC (Houston, Tex.). The amount of residual contaminants tested in Example 9 were measured by ion chromatography analysis, the results of which are shown below in Table 14.

TABLE 14

| Sample No. | Treatment | Amount (mg/L) | | | | |
|---|---|---|---|---|---|---|
| | | BrO$_3^-$ | ClO$_3^-$ | ClO$_2^-$ | BrO$^-$ | ClO$^-$ |
| 1 | 1 lb/bbl eq. SAFE-SCAV ™ | 270 | 300 | ND (<100) | ND | ND |
| 2 | 2 lb/bbl eq. SAFE-SCAV ™ | 250 | 300 | ND (<100) | ND | ND |
| 3 | 4 lb/bbl eq. SAFE-SCAV ™ | 150 | 300 | ND (<100) | ND | ND |
| 4 | 8 lb/bbl eq. SAFE-SCAV ™ | ND (<100) | 300 | ND (<100) | ND | ND |

Example 11

Samples of reclaimed brine of Example 8 were subjected to various treatments for varying amounts of time, and syringe filtered (1.6 micron filter), and the residual contaminants (bromate and chlorate) were measured by ion chromatography analysis, the results of which are shown below in Table 15.

TABLE 15

| Sample No. | Treatment | Amount (mg/L) | |
|---|---|---|---|
| | | BrO$_3^-$ | ClO$_3^-$ |
| 1 | 0.02 lbs KI to 15 mL fluid (stirred 18 hrs) | 185 | ND |
| 2 | 0.04 lbs KI to 15 mL (stirred 18 hrs) | 204 | ND |
| 3 | 0.4% (v/v) of 88% formic acid to 20 mL fluid (stirred for 16 hrs) | ND | ~160 |
| 4 | 1 lb/bbl eq. carbon to 20 mL fluid (stirred 2.5 days, static 2.5 days) | 188 | ND |
| 5 | 8 lb/bbl eq. SAFE-SCAVA ™ to 20 mL fluid (stirred 5 hrs) + 1 lb/bbl eq. carbon (stirred 2.5 days, static 2.5 days) | ND | ND |
| 6 | 0.4% (v/v) of 88% formic acid to 20 mL fluid (stirred for 5 hrs) + 1 lb/bbl eq. carbon (stirred 2.5 days, static 2.5 days) | ND | ND |

Advantageously, embodiments of the present disclosure provide for at least one of the following. In view of the increasingly stringent standards of contaminants present in brines recovered from a completion or drilling operation, reduction and/or removal of thiocyanates may be achieved through the reclamation processes of the present disclosure.

While thiocyanates may be desirable in some completion or drilling operations, they are not necessarily desirable in all, and in fact may lead to stress cracking. Thus, by reduction and/or removal of thiocyanates, brines may be safely reused in subsequent completion or drilling operations. Further, with the high expense of some types of brines, cost efficiency may be maintained.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method for reclamation of a brine, comprising:
    treating a brine of a wellbore fluid containing thiocyanates, at least one halide salt and iron, to remove at least a portion of the iron from the brine;
    after the treating, mixing the brine with an oxidizing agent;
    allowing for a time sufficient for the oxidizing agent to oxidize at least a portion of the thiocyanates; and
    subjecting the brine to at least one additional reclamation process, wherein the at least one additional reclamation process comprises at least one of carbon treatment or addition of reducing agents.

2. The method of claim 1, wherein the oxidizing agent comprises at least one peroxide.

3. The method of claim 1, wherein the oxidizing agent comprises at least one of a peroxide, triiodide ion, an oxyanion of chlorine, an oxyanion of bromine, or an oxyanion of iodine.

4. The method of claim 1, further comprising:
    removing oxidized thiocyanate products from the brine.

5. The method of claim 4, wherein the removing oxidized thiocyanate products step comprises converting a soluble form of the oxidized thiocyanate product to an insoluble form.

6. The method of claim 5, wherein the removing oxidized thiocyanate products step comprises separating the insoluble form of the oxidized thiocyanates product from the brine.

7. The method of claim 1, wherein following the oxidation of least a portion of the thiocyanates, the brine contains less than 10 mg/L thiocyanates.

8. The method of claim 1, wherein the ratio of thiocyanate to oxidizing agent may range from about 1 mg/L:3 mg/L to 1 mg/L:10 mg/L.

9. The method of claim 7, wherein the ratio of thiocyanate to oxidizing agent may range from about 1 mg/L:3 mg/L to 1 mg/L:7 mg/L.

10. The method of claim 1, further comprising:
    collecting the brine of a wellbore fluid containing thiocyanates, at least one halide salt and iron from a well.

11. The method of claim 1, wherein the at least one halide salt is present in an amount ranging from about 20% to about 60% based on the total weight of the brine.

12. The method of claim 1, wherein the treating step comprises removing at least a portion of iron from the brine using a flocculant and filtration.

13. A method for reclamation of a brine, comprising:
    treating a brine of a wellbore fluid containing thiocyanates, at least one halide salt and iron, to remove at least a portion of the iron from the brine;
    after the treating, mixing the brine with an oxidizing agent selected from at least one of a peroxide, triiodide ion, an oxyanion of chlorine, an oxyanion of bromine, or an oxyanion of iodine,
    allowing for a time sufficient for the oxidizing agent to oxidize at least a portion of the thiocyanates;
    determining the quantity of unoxidized thiocyanates after the oxidizing; and
    subjecting the brine to at least one additional reclamation process, wherein the at least one additional reclamation process comprises at least one of carbon treatment or addition of reducing agents.

14. The method of claim 13, further comprising:
    removing oxidized thiocyanate products from the brine.

15. The method of claim 14, wherein the removing oxidized thiocyanate products step comprises converting a soluble form of the oxidized thiocyanate product to an insoluble form.

16. The method of claim 15, wherein the removing oxidized thiocyanate products step comprises separating the insoluble form of the oxidized thiocyanates product from the brine.

17. The method of claim 13, wherein following the oxidation of least a portion of the thiocyanates, the brine contains less than 10 mg/L thiocyanates.

18. The method of claim 13, wherein the ratio of thiocyanate to oxidizing agent may range from about 1 mg/L:3 mg/L to 1 mg/L:10 mg/L.

19. The method of claim 18, wherein the ratio of thiocyanate to oxidizing agent may range from about 1 mg/L:3 mg/L to 1 mg/L:7 mg/L.

20. The method of claim 13, further comprising:
    collecting the brine of a wellbore fluid containing thiocyanates, at least one halide salt and iron from a well.

21. The method of claim 13, wherein the at least one halide is present in an amount ranging from about 20% to about 60% based on the totally weight of the brine.

22. The method of claim 13, wherein the treating step comprises removing at least a portion of iron from the brine using a flocculant.

* * * * *